(12) United States Patent
Boehling et al.

(10) Patent No.: US 9,249,029 B2
(45) Date of Patent: Feb. 2, 2016

(54) SINGLE CHAMBER VAPORIZER AND USE THEREOF IN CHEMICAL SYNTHESIS

(75) Inventors: Ralf Boehling, Lorsch (DE); Michael Schipper, Ludwigshafen (DE); Stefan Birnbach, Dirmstein (DE); Peter Petersen, Dannstadt-Schauernheim (DE); Achim Gritsch, Rotterdam (NL); Alois Wellisch, Lambrecht (DE); Hermann Luyken, Ludwigshafen (DE); Albert Steiner, Ludwigshafen (DE); Peter Zehner, Weisenheim am Berg (DE)

(73) Assignee: BASF SE, Ludwigshafen (DE)

( * ) Notice: Subject to any disclaimer, the term of this patent is extended or adjusted under 35 U.S.C. 154(b) by 498 days.

(21) Appl. No.: 13/011,315

(22) Filed: Jan. 21, 2011

(65) Prior Publication Data

US 2011/0182798 A1    Jul. 28, 2011

Related U.S. Application Data

(60) Provisional application No. 61/297,297, filed on Jan. 22, 2010.

(51) Int. Cl.
| | |
|---|---|
| *C01C 3/02* | (2006.01) |
| *F22B 33/00* | (2006.01) |
| *F01K 23/06* | (2006.01) |
| *F22B 27/00* | (2006.01) |

(52) U.S. Cl.
CPC ............ *C01C 3/0204* (2013.01); *F01K 23/064* (2013.01); *F22B 27/00* (2013.01); *F22B 33/00* (2013.01)

(58) Field of Classification Search
CPC ....................................................... C01C 3/02
See application file for complete search history.

(56) References Cited

U.S. PATENT DOCUMENTS

| | | | |
|---|---|---|---|
| 2,042,451 A | 6/1936 | Bond et al. | |
| 2,429,262 A | 10/1947 | Fallows et al. | |
| 2,529,546 A | 11/1950 | Fallows et al. | |
| 2,534,000 A | 12/1950 | Coopey | |
| 4,693,877 A | 9/1987 | Oehsen et al. | |
| 6,942,023 B2 * | 9/2005 | Fang et al. | 165/140 |
| 2005/0022940 A1 | 2/2005 | Kupper et al. | |
| 2005/0082047 A1 * | 4/2005 | Kaellis | 165/159 |
| 2006/0110309 A1 | 5/2006 | Babler et al. | |
| 2007/0113566 A1 * | 5/2007 | Varney | 62/178 |
| 2007/0186771 A1 * | 8/2007 | Thundyil et al. | 95/214 |

(Continued)

FOREIGN PATENT DOCUMENTS

| | | |
|---|---|---|
| CA | 2 705 658 | 5/2009 |
| CN | 100435929 | 11/2008 |

(Continued)

OTHER PUBLICATIONS

International Search Report and Written Opinion issued Jul. 15, 2011, in PCT/EP2011/050805 with English translation of category of cited documents.

(Continued)

*Primary Examiner* — Kaj K Olsen
*Assistant Examiner* — Jenny Wu
(74) *Attorney, Agent, or Firm* — Oblon, McClelland, Maier & Neustadt, L.L.P.

(57) ABSTRACT

The invention relates to an improved process for vaporizing organic compounds and the further conversion thereof.

7 Claims, 5 Drawing Sheets

(56) References Cited

U.S. PATENT DOCUMENTS

Figure 1:
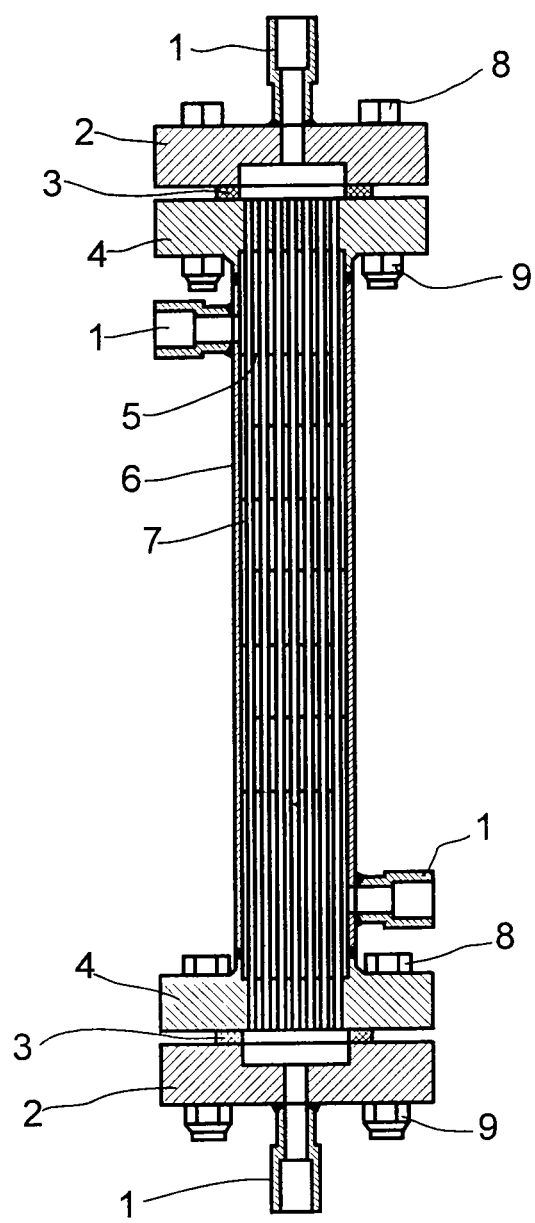

| | | |
|---|---|---|
| 2008/0307825 A1 | 12/2008 | Kolb et al. |
| 2010/0316552 A1 | 12/2010 | Boehling et al. |

FOREIGN PATENT DOCUMENTS

| | | |
|---|---|---|
| DE | 477 437 | 7/1930 |
| DE | 1 000 796 | 1/1957 |
| DE | 973 173 | 12/1959 |
| DE | 1 209 561 | 1/1966 |
| DE | 101 44 891 A1 | 3/2003 |
| DE | 101 38 553 A1 | 5/2003 |
| DE | 10 2005 051 6 | 5/2007 |
| EP | 0 209 039 A2 | 1/1987 |
| GB | 800158 | 8/1958 |
| JP | 2006-508883 | 3/2006 |
| JP | 2007-39459 | 2/2007 |
| JP | 2008-157932 | 7/2008 |
| JP | 2009-095691 | 5/2009 |
| WO | WO 02/070588 A1 | 9/2002 |
| WO | WO 2004/050587 A2 | 6/2004 |
| WO | WO 2005/016512 A1 | 2/2005 |
| WO | WO 2006/108796 A1 | 10/2006 |
| WO | WO 2007/048641 | 5/2007 |

OTHER PUBLICATIONS

V. V. Wadekar, "Heat Exchangers in Process Industry and Mini-And Microscale Heat Transfer", Enhances, Compact and Ultra-Compact Heat Exchangers: Science, Engineering and Technology, Sep. 2005, pp. 318-322.

* cited by examiner

SINGLE CHAMBER VAPORIZER AND USE THEREOF IN CHEMICAL SYNTHESIS

The invention relates to single-chamber vaporizers and to the use thereof in the chemical synthesis of compounds, especially processes for preparing organic compounds by vaporizing a reactant E and reacting the vaporized reactant E in a downstream reactor.

It is known that liquid reactants can be vaporized before they are reacted further with themselves or other reactants. The energy supplied in the vaporization may, especially in the case of unstable compounds, lead to unwanted decompositions and other reactions.

For example, obtaining hydrogen cyanide by formamide thermolysis is known. Hydrogen cyanide is an important commodity chemical which serves as a starting material, for example, in numerous organic syntheses such as the preparation of adiponitrile, methacrylic esters, methionine and complexing agents (NTA and EDTA). In addition, it is required for the preparation of alkali metal cyanides, which are used in mining and in the metallurgical industry.

The greatest amount of HCN is produced by reaction of methane (natural gas) and $NH_3$. In the Andrussow process, atmospheric oxygen is added simultaneously. In this way, the preparation runs autothermally. In contrast, the BMA process of Degussa works without oxygen. The endothermic catalytic reaction of methane with $NH_3$ is therefore conducted externally with a heating medium (methane or $H_2$).

A further important process for preparing HCN is the SOHIO process. This ammoxidation of propene/propane to acrylonitrile forms approx. 10% (based on C3) of HCN as secondary yield.

A further important process for industrial preparation of hydrogen cyanide is the thermal dehydration of formamide under reduced pressure, which proceeds according to the following equation (1):

$$HCONH_2 \rightarrow HCN + H_2O \qquad (1)$$

This reaction is accompanied by the decomposition of formamide according to the following equation (2) to form ammonia and carbon monoxide:

$$HCONH_2 \rightarrow NH_3 + CO \qquad (2)$$

The ammonia formed catalyzes the polymerization of the desired hydrogen cyanide and thus leads to an impairment in the quality of the hydrogen cyanide and a decrease in the yield of the desired hydrogen cyanide.

The polymerization of hydrogen cyanide and the associated soot formation can be suppressed by the addition of small amounts of oxygen in the form of air, as disclosed, for example, in EP-A 0 209 039 A2. EP-A 0 209 039 A2 discloses a process for thermolytic dissociation of formamide over highly sintered aluminum oxide or aluminum oxide-silicon dioxide shaped bodies, or over chromium-nickel stainless steel shaped bodies which are resistant to corrosion at high temperature. The formamide conversion in this process is incomplete and, moreover, ammonia and carbon monoxide form as by-products according to equation (2). Thus, removal and recycling of the residual formamide is necessary, which forms high-boiling by-products which have to be removed from the process. In addition, the amount of air added leads to formation of carbon dioxide from the carbon monoxide formed according to equation (2), which reacts with the ammonia formed simultaneously to give solid carbamates, thus leading to deposits which are difficult to manage and to corrosion in the plants used (solids problems). The dissociation is generally performed in stainless steel or iron tubes, the exact composition of which is not mentioned.

U.S. Pat. No. 2,042,451 relates to the dehydration of formamide to prepare HCN. The catalyst used is a heated surface (brass or iron) coated by a thin catalytically active oxide layer of Zn, Al, Mg, Cr or Sn oxide. The reaction chamber is the intermediate space between a cylindrical metallic tube and a cylindrical metallic rod which has been introduced into the tube. According to the description, it is important that no part of the gas is more than ½ inch removed from the catalytic surface. The process achieves conversions of 73 to 89%, based on formamide.

DE 1 209 561 B relates to a process for preparing HCN by dissociating formamide vapor over iron(III) oxide as a catalyst, which has been deactivated by partial or complete binding of acids to form salts or by combination with one or more nonvolatile oxides of mono- to hexavalent metals. The catalysts are in the form of pellets or in the form of catalyst grains manufactured by extrusion.

The dissociation is performed in a dissociation furnace with tubes composed of an Fe alloy which comprises, for example, as well as Fe, 13% Cr, 1% Al, 1% Si, <1% Mn and approx. 0.1% C.

DE 1 000 796 B relates to a process for dissociating formamide vapor, which takes account of a temperature gradient within the furnace for dissociation by effecting the dissociation over particulate or granular iron oxide-containing silicates or spinels which have been fired at a high temperature in a dissociation chamber whose walls have a lower catalytic activity than that of the catalysts in the dissociation chamber. The walls consist, for example, of stainless steel comprising especially approx. 85% Fe and approx. 16% Cr. The dissociation chamber is formed from externally heated tubes.

DE 477 437 C relates to a process for catalytic preparation of hydrogen cyanide from formamide, wherein formamide vapors are passed in high dilution and with high velocity in the absence of water-releasing catalysts at temperatures above 300° C. over metal catalysts such as mild steel, V2A steel, nickel or aluminum. In one embodiment, the reaction is carried out in tubes which are produced from or lined with catalytically active metal and do not comprise any other catalyst.

WO 2004/050587 A2 describes a process for preparing HCN from formamide, wherein the dissociation is performed in empty metal tubes. This process has the advantage that the selectivity according to eq. 1 is high, even if a lower vacuum is applied. In contrast to other patent specifications, pressures up to 300 mbar are possible.

The need to perform the formamide thermolysis at minimum pressures (vacuum) is known. This fact is a crucial disadvantage of the economic viability of the FA process. There has therefore been no lack of attempts to perform the dissociation also at pressures close to standard pressure. This is opposed, however, by the instability of formamide. In the evaporation, it is therefore generally important to remain below temperatures of approx. 160° C. This is possible only with a reduced pressure of approx. 150 mbar or less.

According to U.S. Pat. Nos. 2,429,262 and 2,529,546, attempts have therefore been made to vaporize it by flash vaporization in flash vaporizers at standard pressure, and then to convert it to HCN. However, the selectivity was low.

The use of microstructured apparatuses for vaporization is described in WO 2005/016512 A1 and WO 2006/108796 A1. Advantages are high heat transfer performance per unit area, compact design and rapid startup. Although it is possible with this vaporizer type to vaporize the formamide without decomposition at standard pressure or slightly elevated pressure, such that no polymers form in the vaporizer, impurities in the formamide, for example traces of metals, or relatively high-boiling constituents block the microchannels in which total vaporization of the formamide takes place. DE 973 173 C therefore proposes a thin-film vaporizer with rotating wiper blades as a vaporizer. This vaporizer type has to ensure an uninterrupted liquid film adjoining the heated surface, which flows downward coherently. Disadvantages of this vaporizer type are small heat transfer areas based on the vaporizer volume, since only the heated vaporizer wall is used, and the technically complex, fault-prone rotating shaft with stirrer paddles.

It was therefore an object of the present invention to provide a process for preparing organic compounds by vaporizing compounds, especially unstable compounds, and the further conversion thereof, which can be performed at pressures and temperatures as high as possible, without significant impairment of the reactant to be vaporized. More particularly, it was an object of the present invention to provide a process for preparing hydrogen cyanide by catalytic dehydration of gaseous formamide in the presence of atmospheric oxygen, which has a high selectivity for the desired hydrogen cyanide and can be operated at pressures as high as possible (close to standard pressure or higher).

The invention relates to a process for preparing organic compounds by vaporizing a reactant E in a vaporizer and transferring the vaporized reactant E to a reactor C in which the reactant E reacts with itself or at least one further reactant E2 in the vapor phase with decomposition or reaction, wherein the vaporizer, referred to hereinafter as "single-chamber vaporizer", has heating tubes HR essentially within one vessel, which preferably run parallel to one another and to the longitudinal axis of the vaporizer, where said vessel preferably consists only of one chamber R, and where a) the outer area of the heating tubes HR based on the chamber R is at least 300 $m^2/m^3$,
b) the hydraulic diameter of the chamber R is 0.03 to 1 m,
c) the chamber has a length of 0.1 to 5 m.

The hydraulic diameter is calculated from 4 times the ratio of free cross-sectional area A (cross-sectional area minus the area filled, for example, by internals) and the circumference of the shell U. The chamber R corresponds to the free shell space minus the internals.

Single-chamber Vaporizer

The invention further relates to a vaporizer for use in accordance with the invention, referred to hereinafter as "single-chamber vaporizer", wherein the vaporizer has essentially one vessel and heating tubes HR within the vessel, which preferably run parallel to one another and to the longitudinal axis of the vaporizer, where said vessel preferably consists only of one chamber R, and where a) the outer area of the heating tubes HR based on the chamber R is at least 300 $m^2/m^3$,
b) the hydraulic diameter of the chamber R is 0.01 to 1 m,
c) the chamber has a length of 0.1 to 5 m.

The shell of the vaporizer may in principle have any desired geometry, but is preferably circular. In particular embodiments, it may, however, also differ therefrom and, for example, be hexagonal. Polymers which form during the vaporizing operation, or unvaporizable fractions present in the reactant stream, can be drawn off via an additional outlet at the base of the vaporizer.

In the single-chamber vaporizer, all of the formamide to be vaporized is vaporized in a coherent chamber. The hydraulic diameter of this chamber is preferably 0.03 to 1 m, the length preferably 0.1 to 5 m. The chamber is permeated by channels which are operated, for example, with steam whose pressure corresponds to a condensation temperature at least 5° C. above the boiling temperature of the formamide. The maximum distance of a particle from the closest wall is merely a fraction of the hydraulic diameter of the vaporizer chamber, preferably 100-1500 µm. The single-chamber vaporizer can therefore be considered as a micro- or millistructured apparatus. As an alternative to steam, the temperature control medium used may also be hot gas or hot liquid, the inlet temperature of which into the single-chamber vaporizer is at least 5° C. above the boiling temperature of formamide. The outer area of the channels which pass through the vaporization chamber, based on the free volume of the vaporization chamber, should be between 300 and 3000 $m^2/m^3$.

In a particularly preferred embodiment, a single-chamber vaporizer (see FIG. 1) which comprises a multitude of, for example, temperature control channels arranged in parallel is used. One illustrative embodiment is that of a shell and tube apparatus. In contrast to apparatuses customary in industry, the internal channel diameter is, however, preferably 100 to 6000 µm. The distance between two adjacent channels should be less than 3 mm, in order to achieve maximum vaporizer chamber-specific surface areas of 300 to 3000 $m^2/m^3$. These high surface areas are needed to achieve formamide residence times of less than 60 sec, based on the liquid holdup of the vaporization chamber.

Figure 2:
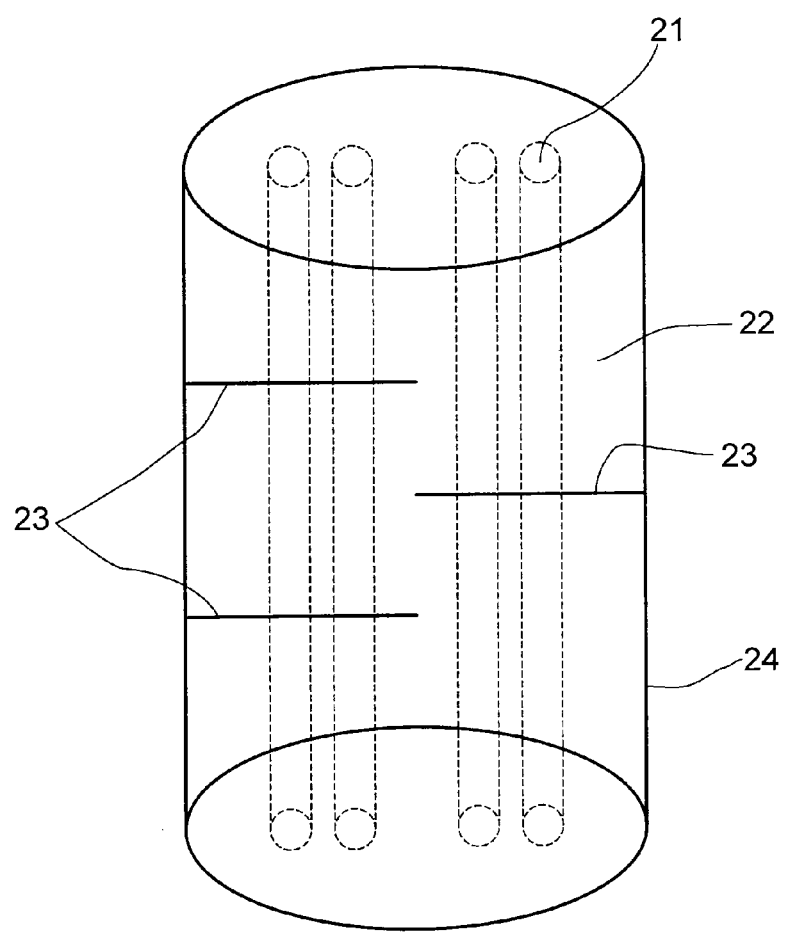
Figure 3:
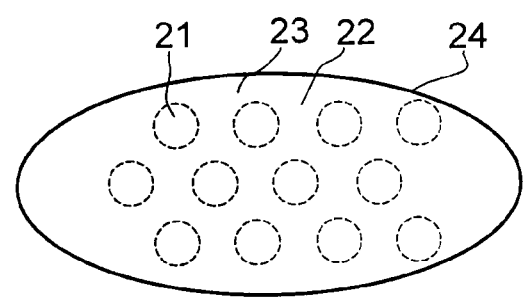
Figure 4:
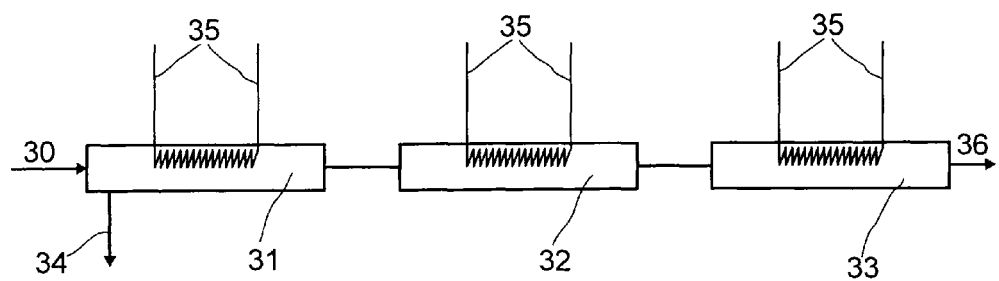
Figure 5:
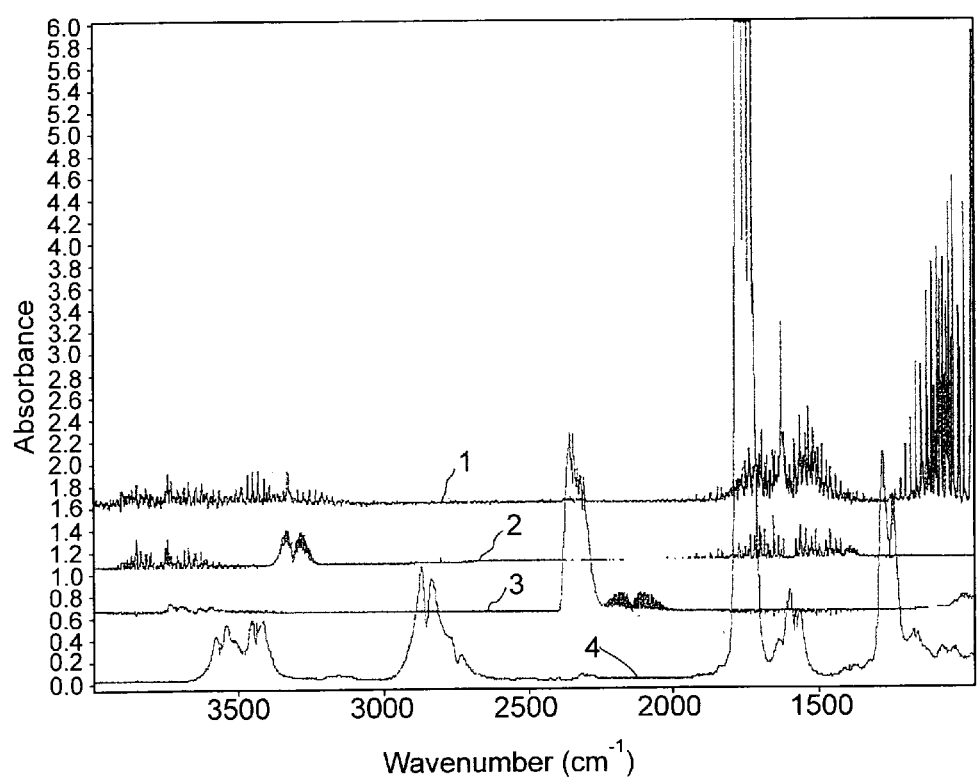

The invention is described in detail hereinafter with reference to drawings. The drawings show:

FIG. 1—a vaporizer in longitudinal section, in which the reference numerals mean:
  1: inlet and outlet of the temperature control medium
  2: connecting flange
  3: seal
  4: connecting flange
  5: guide plate
  6: single-chamber vaporizer shell
  7: temperature control channel
  8: hexagonal bolt
  9: hexagonal nut FIG. 2 and FIG. 3—a vaporizer in section, in which the reference numerals mean:
  21: heating channels
  22: shell space
  23: guide plates
  24: apparatus shell FIG. 4—flow diagram for evaporation and reaction, in which:
  30: vaporizer feed
  31: single-chamber vaporizer
  32: preheater
  33: dehydration reactor
  34: purge stream
  35: temperature control side of the apparatus, heating medium, for example steam, circulating gas or liquid heat transfer media
  36: reactor outlet FIG. 5 shows the IR spectra of the pure components, in which:
  1) $NH_3$
  2) HCN
  3) mixture of $CO_2$ and CO
  4) IR spectrum of the single-chamber vaporizer offgas In a preferred embodiment, the invention relates to a process for preparing hydrogen cyanide (HCN) by catalytic dehydration of gaseous formamide in the presence of atmospheric oxygen, wherein the formamide is vaporized in an inventive single-chamber vaporizer, initially at pressures above 600 mbar and temperatures above 200° C. with yield losses of <1%.

PROCESS DESCRIPTION

Step i)

Formamide is vaporized with the aid of a single-chamber vaporizer. A purge stream can be withdrawn from the vaporization space to remove polymer residues or other metals or higher-boiling constituents present in traces in the formamide. The purge stream can be cleaned according to the prior art and fed back to the vaporizer.

Step ii)

The formamide vapor is subsequently converted to HCN in a reactor according to the prior art. Air is generally supplied to the vaporous formamide. The air content can optionally be supplied in the preheated state. An essential factor for a high selectivity is that the actual decomposition apparatus has an Fe-containing surface.

In general, liquid formamide is supplied to the vaporizer. This is vaporized in step i) of the process according to the invention to give gaseous formamide which is then used in the catalytic dehydration in step ii) of the process according to the invention.

Preferably, the formamide is vaporized completely (without residue) in step i) of the process according to the invention. More preferably, the formamide is vaporized completely in step i), and the formamide vapor which forms is superheated to temperatures of generally 230° C. or more. The superheated formamide vapor can be used directly in step ii).

Before the supply of the gaseous formamide obtained in step i) to step ii) of the process according to the invention, oxygen can be supplied to the gaseous formamide, for example in the form of atmospheric oxygen or in the form of an oxygen-comprising gas mixture, in which case the oxygen content can optionally be supplied in a preheated state.

In a preferred embodiment, step ii) of the process according to the invention is performed in the presence of oxygen, preferably atmospheric oxygen. The amounts of oxygen, preferably atmospheric oxygen, are generally >0 to 10 mol %, based on the amount of formamide used, preferably 0.1 to 10 mol %, more preferably 0.5 to 3 mol %.

Subsequently, the gaseous formamide (formamide vapor) or the formamide-oxygen mixture, preferably the formamide-air mixture, can be brought to temperatures of 350° C. or more in a heat exchanger, before it is supplied to step ii). However, it is likewise possible to use the aforementioned slightly superheated formamide vapor obtained in step i) directly, optionally after addition of oxygen, in step ii).

The catalytic dehydration in step ii) of the process according to the invention is effected generally at temperatures of 350 to 650° C., preferably 380 to 550° C., more preferably 440 to 510° C. When, however, higher temperatures are selected, worse selectivities are to be expected.

The pressure in step ii) of the process according to the invention is generally 70 mbar to 5 bar, preferably 3 bar, especially 2 bar, even more preferably 400 mbar to 2.0 bar and especially preferably 600 mbar to 1.5 bar.

Reactor for Dehydration

The reactors used in step ii) of the process according to the invention may be all reactors known to those skilled in the art for dehydration of formamide. Preference is given to using tubular reactors in step ii) of the process according to the invention, suitable tubular reactors being known to those skilled in the art. More preferably, the tubular reactors are multitube reactors. Suitable multitube reactors are likewise known to those skilled in the art.

Suitable materials of the reactors used in step ii) of the process according to the invention are likewise known to those skilled in the art. Preference is given to using an iron-containing surface as the inner surface of the reactor. In a particularly preferred embodiment, the inner reactor surface is formed from steel, which more preferably comprises iron, and also chromium and nickel. The iron content in the steel which preferably forms the inner reactor surface is generally >50% by weight, preferably >60% by weight, more preferably >70% by weight. The remainder is generally nickel and chromium, though small amounts of further metals such as molybdenum, manganese, silicon, aluminum, titanium, tungsten, cobalt may optionally be present with a proportion of generally 0 to 5% by weight, preferably 0 to 2% by weight. Steel qualities suitable for the internal reactor surface are generally steel qualities corresponding to standards 1.4541, 1.4571, 1.4573, 1.4580, 1.4401, 1.4404, 1.4435, 2.4816, 1.3401, 1.4876 and 1.4828. Preference is given to using steel qualities corresponding to standards 1.4541, 1.4571, 1.4828, 1.3401, 1.4876 and 1.4762, particular preference to using steel qualities corresponding to standards 1.4541, 1.4571, 1.4762 and 1.4828.

With the aid of such a tubular reactor, a catalytic dehydration of gaseous formamide to hydrogen cyanide in step ii) of the process according to the invention is possible, without any need to use additional catalysts or for the reactor to have additional internals.

However, it is likewise possible that the catalytic dehydration in step ii) of the process according to the invention is performed in the presence of shaped bodies as catalysts, in which case the shaped bodies are preferably highly sintered shaped bodies formed from aluminum oxide and optionally silicon oxide, preferably from 50 to 100% by weight of aluminum oxide and 0 to 50% by weight of silicon oxide, more preferably from 85 to 95% by weight of aluminum oxide and 5 to 15% by weight of silicon oxide, or from chromium-nickel stainless steel, as described, for example, in EP-A 0 209 039. In addition, suitable catalysts used in step ii) of the process according to the invention may be packings formed from steel or iron oxide on porous support materials, for example aluminum oxide. Suitable packings are described, for example, in DE-A 101 38 553.

When shaped bodies are used, the possible shaped bodies used may be either structured or unstructured packings, for example Raschig rings, Pall rings, tablets, spheres and similar packings. What is essential here is that the packings enable good heat transfer with a moderate pressure drop. The size and geometry of the packings used is guided generally by the internal diameter of the reactors to be filled with these shaped bodies, preferably tubular reactors.

Suitable packings composed of steel or iron oxide are generally structured packings. The structured packings are preferably static mixers. The use of the static mixers allows a homogeneous pressure and outstanding heat transfer to be achieved in the tubular reactor. The static mixers may have any desired geometries as known to those skilled in the art. Preferred static mixers are formed from metal sheets, which may be perforated sheets and/or formed sheets. It is of course likewise possible to use formed perforated sheets.

Suitable shaped bodies are described in EP-A 0 209 039, and suitable static mixers are described in DE-A 101 38 553.

It is likewise possible that, in step ii) of the process according to the invention, a reactor, preferably a tubular reactor, is used, which has shaped bodies and/or packings composed of steel or iron oxide on a porous support, and whose reactor wall is additionally catalytically active. Suitable reactor wall materials which are catalytically active in step ii) of the process according to the invention are mentioned above and are described, for example, in WO 02/070588.

The optimal residence time of the formamide gas stream in step ii) of the process according to the invention, in the case of use of a tubular reactor, is calculated from the superficial formamide velocity, which is generally 0.1 to 100 kg/m$^2$, preferably 2 to 50 kg/m$^2$, more preferably 4 to 30 kg/m$^2$. The dehydration is preferably performed in the laminar flow range.

The process according to the invention for preparing hydrogen cyanide gives the desired hydrogen cyanide in high selectivities of generally >85%, preferably >90%, and conversions of generally >70%, preferably >80%, and so yields of generally >60%, preferably >75%, more preferably >90% are achieved.

EXAMPLE

A single-chamber vaporizer of the following specification was used:
Single-Chamber Vaporizer:
  internal shell diameter: 29.7 mm
  hydraulic diameter: 17.2 mm
  length of the vaporizer chamber: 200 mm
  number of heating channels: 37
  total length:
  internal/external diameter of the heating channels: 1.77 and 3.17 mm
  separation of the heating channels based on the center thereof: 4 mm
  outer area of the temperature control channels/free volume of the vaporization
  chamber: 919 m$^2$/m$^3$ Formamide was vaporized at 800 mbar in the above-described vaporizer. The temperature control medium used was steam at a pressure of 45 bar. The steam was supplied to the temperature control channels superheated at 270° C. The amount of formamide supplied was 7 kg/h. The complete vaporization of the formamide was ensured by significant superheating of the formamide vapor by means of temperature measurement at the single-chamber vaporizer outlet. At the operating pressure of 800 mbar, the boiling point of formamide is approx. 210° C. The exit temperature of the formamide was 245° C., and the extent of superheating was accordingly 35° C. Under these conditions, it was not possible to detect any gaseous decomposition products at all in the IR spectrum; see FIG. 5. FIG. 5 shows the IR spectra of the pure components, in which:

1) $NH_3$
2) HCN
3) mixture of $CO_2$ and CO
4) IR spectrum of the single-chamber vaporizer offgas

The invention claimed is:

1. A process for preparing an organic compound, the process comprising:
   vaporizing a reactant in a vaporizer; transferring the vaporized reactant to a reactor; and reacting the vaporized reactant in the reactor with itself or at least one further reactant in the vapor phase with decomposition or reaction, to obtain an organic compound,
   wherein the vaporizer consists of only one chamber, which is a shell and tube chamber, comprising heating tubes comprising a heating medium and optionally running parallel to one another and to the longitudinal axis of the vaporizer, and wherein a) the outer area of the heating tubes based on the chamber is at least 300 mZ/m3, b) the hydraulic diameter of the chamber is 0.03 to 1 m, and c) the chamber has a length of 0.2 to 5 m, wherein liquid formamide is vaporized in the vaporizer and is then catalytically dehydrated in the reactor, wherein the catalytic dehydration is performed at a pressure of 600 mbar to 1.5 bar absolute and at a temperature from 440 to 510° C.

2. The process according to claim 1, wherein the internal diameter of the heating tubes is 100 to 6000 μm and the shortest distance between the heating tubes is not more than 3 mm.

3. The process according to claim 1, wherein the catalytic dehydration is effected in a tubular reactor optionally a multitube reactor.

4. The process according to claim 1, wherein the catalytic dehydration is effected in the presence of shaped bodies selected from sintered shaped bodies formed from aluminum oxide and optionally silicon oxide and chromium-nickel stainless steel shaped bodies, or in the presence of packings composed of steel or iron oxide on porous support materials as catalysts, and/or the inner reactor surface of the tubular reactor is formed from steel and serves as a catalyst.

5. The process according to claim 1, wherein the catalytic dehydration is performed in the presence of oxygen.

6. The process according to claim 3, wherein the catalytic dehydration is effected at a superficial formamide velocity of 0.1 to 100 kg/m$^2$ in a laminar flow range.

7. The process according to claim 1, wherein the heating tubes run parallel to one another and to the longitudinal axis of the vaporizer.

* * * * *